2,897,237
SUBSTITUTED TETRAHYDRONAPHTHALENES

Marion S. Carpenter, Nutley, William M. Easter, Jr., Hasbrouck Heights, and Thomas F. Wood, Little Falls, N.J., assignors to The Givaudan Corporation, New York, N.Y., a corporation of New Jersey No Drawing. Application December 14, 1953
Serial No. 398,208

10 Claims. (Cl. 260—592)

This invention relates to novel chemical compounds, and more especially to acetylated tetrahydronaphthalenes having musk-like odors.

Most of the known synthetic musk-like compounds fall into two classes: (1) nitrated aromatic hydrocarbons, such as musk xylene, and (2) macrocyclic ketones, lactones or esters, such as cyclopentadecanone, cyclopentadecanolide, and ethylene brassylate. While members in the first group are inexpensive to manufacture, they suffer from the disadvantage that they are not light-stable or alkali-stable, frequently causing discoloration in products such as soap. Members of the second group, while reasonably stable to light and alkalies, are difficult to manufacture and are relatively costly.

We have found that certain novel chemical compounds which we have synthesized have the desirable property of being musk-like in olfactory character and yet are extremely stable to light and alkalies, and, at the same time, are inexpensive to manufacture and hence not relatively costly.

Our novel chemical compounds are lower alkyl-substituted, 7 - acetyl - 1,1,4,4 - tetramethyl - 1,2,3,4 - tetrahydronaphthalenes. Most of them are white, crystalline compounds. All are soluble in benzene, ethyl alcohol, ethylene dichloride and similar solvents. All possess musk-like odors per se or in solution and all are light-stable and alkali-stable.

In general, our novel, musk-like compounds are prepared by condensing 2,5-dichloro-2,5-dimethyl hexane with a lower alkyl-substituted benzene hydrocarbon in the presence of a suitable condensing agent such as aluminum chloride or ferric chloride, and then acetylating the resulting condensation products.

It will be readily apparent that our novel musk-like compounds can be employed in widely-varying formulations, depending upon the type of formulation, the odor effect desired, the desires of the compounder of the formulation, etc. Consequently, we do not wish to confine ourselves to any particular formulation, but wish it to be understood that our products can be employed as musks in perfume-containing formulations in general. By the term "perfume-containing" we include, inter alia, perfumes, cosmetics, soaps.

The structural formula of our novel products can be represented as follows:

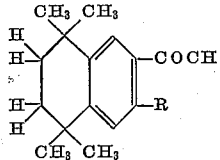

wherein R is a lower alkyl radical. Examples of specific compounds we have prepared include 7-acetyl-1,1,4,4,6 - pentamethyl - 1,2,3,4 - tetrahydronaphthalene; 7 - acetyl - 1,1,4,4 - tetramethyl - 6 - ethyl - 1,2,3,4-tetrahydronaphthalene; 7 - acetyl - 1,1,4,4 - tetramethyl-6-isopropyl-1,2,3,4-tetrahydronaphthalene, and 7-acetyl-1,1,4,4 - tetramethyl - 6 - t - butyl - 1,2,3,4 - tetrahydronaphthalene.

The following examples are given in order more fully to illustrate this invention, without however limiting the same to them, it being understood that the melting points given are uncorrected.

EXAMPLE 1

*Preparation of 7-acetyl-1,1,4,4,6-pentamethyl-1,2,3,4-tetrahydronaphthalene*

A mixture of 275 grams of toluene and 10 grams of aluminum chloride was cooled to 20° C. and to it was added a solution of 183 grams of 2,5-dichloro-2,5-dimethylhexane in 185 grams of toluene during 45 minutes, keeping the temperature at 20–25° C. and agitating continuously. After quenching, washing to neutrality and distilling, there was obtained, in addition to the excess of toluene, 197 grams of a colorless, practically odorless oil boiling at 78° C./1.5 mm. Hg and melting at 29° C., which is 1,1,4,4,6-pentamethyl-1,2,3,4-tetrahydronaphthalene.

A mixture of 85 grams of acetyl chloride and 197 grams of the 1,1,4,4,6-pentamethyl-1,2,3,4-tetrahydronaphthalene prepared as above indicated was added during the course of 30 minutes to a suspension of 146 grams of aluminum chloride in 500 grams of ethylene dichloride, agitating the mixture throughout the reaction period and cooling to maintain a temperature of 20–25° C. The solution was quenched on ice, the ethylene dichloride layer was washed with water to neutrality, the solvent was distilled off and the remaining oil was distilled in vacuo to yield 226 grams of a colorless oil boiling at 130–132°/2 mm. Hg which rapidly congealed. Upon crystallization from alcohol there was obtained 201 grams of the desired product in the form of colorless crystals of M.P. 62–63.5° C., having a musk-like odor.

*Analysis.*—Found: percent C, 83.64; percent H, 9.63.
Calc. for $C_{17}H_{24}O$: percent C, 83.53; percent H, 9.89.
The semi-carbazone was made and found to have an M.P. of 199°–201° C.

EXAMPLE 2

*Preparation of 7-acetyl-1,1,4,4-tetramethyl-6-ethyl-1,2,3,4-tetrahydronaphthalene*

A mixture of 93 grams of ethylbenzene and 2 grams of anhydrous ferric chloride was cooled to —5° C. and to it was added a solution of 61 grams of 2,5-dichloro-2,5-dimethylhexane in 83 grams of ethylbenzene during 30 minutes, maintaining the temperature at —5° C. and agitating continuously. The solution was quenched in water, washed to neutrality and distilled to yield, in addition to the excess of ethylbenzene, 69 grams of a colorless oil boiling at 90°/1.5 mm. Hg and having sp. gr. (25°) 0.920, $n_D^{20}$ 1.5165, which is 1,1,4,4-tetramethyl-6-ethyl-1,2,3,4-tetrahydronaphthalene.

A mixture of 52 grams of acetyl chloride and 130 grams of the product obtained in accordance with the preceding paragraph was added during one hour to a suspension of 92 grams of aluminum chloride in 400 grams of ethylene dichloride at a temperature of 20–25° C. After quenching, washing and distilling as in Example 1 there was obtained 147 grams of a colorless oil boiling at 130°/2 mm. Hg which congealed upon standing. Upon crystallization from alcohol there was obtained 132 grams of the desired product in the form of colorless crystals of M.P. 45–46°, having a musk-like odor.

*Analysis.*—Found: percent C, 83.70; percent H, 10.00.
Calc. for $C_{18}H_{26}O$: percent C, 83.66; percent H, 10.13.
The semi-carbazone was made and found to have a M.P. of 185°–187° C.

EXAMPLE 3

*Preparation of 7-acetyl-1,1,4,4-tetramethyl - 6 - isopropyl-1,2,3,4-tetrahydronaphthalene*

A mixture of 116 grams of cumene and 5 grams of aluminum chloride was cooled to 10° C. and to it was added a solution of 92 grams of 2,5-dichloro-2,5-dimethylhexane in 184 grams of cumene during 45 minutes, keeping the temperature at 10–20° C. and agitating continuously. After quenching, washing to neutrality and distilling, there was obtained, in addition to the excess of cumene, 73 grams of a colorless, practically odorless oil boiling at 100° /1.5 mm. Hg and melting at 27° C., which is 1,1,4,4-tetramethyl-6-isopropyl-1,2,3,4,-tetrahydronaphthalene.

A mixture of 27 grams of acetyl chloride and 72 grams of the product obtained in accordance with the preceding paragraph was added during one hour to a suspension of 47 grams of aluminum chloride in 150 grams of ethylene dichloride at a temperature of 20–25° C. After quenching, washing and distilling as in example 1 there was obtained 70 grams of a colorless oil boiling at 125°/1.5 mm. Hg which rapidly congealed. Upon crystallization from alcohol there was obtained 50 grams of the desired product in the form of colorless crystals of M.P. 84.5–85.5°, having a musk-like odor.

*Analysis.*—Found: percent C, 83.87; percent H, 10.14. Calc. for $C_{19}H_{28}O$: percent C, 83.76; percent H, 10.36.

The semi-carbazone was made and found to have a M.P. of 224°–226° C.

EXAMPLE 4

*Preparation of 7-acetyl-1,1,4,4-tetramethyl-6-t-butyl-1,2,3,4-tetrahydronaphthalene*

A mixture of 152 grams of tert.-butyl benzene and 5 grams of aluminum chloride was cooled to 15° C. and to it was added a solution of 92 grams of 2,5-dichloro-2,5-dimethylhexane in 184 grams of tert.-butyl benzene during one hour, keeping the temperature at 15–25° C. and agitating continuously. After quenching, washing to neutrality and distilling there was obtained, in addition to the excess of tert.-butyl benzene, 51 grams of a colorless, practically odorless oil boiling at 108°/2mm. Hg which rapidly congealed to crystals melting at 58–59.5° C., and which is 1,1,4,4-tetramethyl-6-tert.-butyl-1,2,3,4-tetrahydronaphthalene.

A mixture of 18 grams of acetyl chloride, 50 grams of ethylene dichloride and 50 grams of the product obtained in accordance with the preceding paragraph was added during 40 minutes to a suspension of 30 grams of aluminum choliced in 100 grams of ethylene dichloride at a temperature of 20–25° C. After quenching, washing and distilling as in Example 1 there was obtained 24 grams of the desired product in the form of a colorless oil boiling at 128°/1.5 mm. Hg having a weak, musk-like odor.

*Analysis.*—Found: percent C, 83.55; percent H, 10.38. Calc. for $C_{20}H_{30}O$: percent C, 83.86; percent H, 10.56.

The semi-carbozone was made and found to have a M.P. of 199°–201° C.

In order to illustrate some formulations incorporating our novel products we cite the following examples.

EXAMPLE 5

*Soap containing new musks*

Each of the musk materials made in accordance with Examples 1 to 4, inclusive, was separately dissolved in diethyl phthalate to make a 10% by weight solution.

Each solution was then added separately to white milled soap to produce a soap having 0.2% of the musk product. After thorough mixing and milling soap bars were made.

The bars all had sufficiently-strong and desirable odor. After exposure to accelerated ultra-violet conditions equivalent to at least 100 hours of direct summer sunlight in the New York area, the bars had undergone no discoloration and the alteration in odor was not material.

The bar containing 7-acetyl-1,1,4,4-tetramethyl-6-ethyl-1,2,3,4-tetrahydronaphthalene was deemed to have the best odor and color characteristics.

When the well-known musk ambrette, and other known nitro musks, were substituted for our novel musks, a serious discoloration occurred after the equivalent of 10 hours' exposure in the same sunlight.

EXAMPLE 6

*Cream containing new musks*

A cream was prepared with the following formula:

| Portion A: | Grams |
|---|---|
| Beeswax | 12 |
| Mineral oil | 46 |
| Portion B: | |
| Borax | 1 |
| Water | 39 |
| Portion C: Perfume oil (contained 0.1 to 0.2 gram of musk ambrette) | 2 |

The ingredients of portion A were weighed into a container provided with a source of heat and agitation. The contents were heated and stirred until the temperature was 68° C. and this temperature was maintained until the beeswax melted.

The ingredients of portion B were heated in a separate container until the temperature was 68° C. and then portion B was added to portion A with moderate stirring. The temperature was reduced to 50° C., under stirring, and the perfume oil was added, under stirring, until the perfume was well dispersed.

The cream discolored on standing in the equivalent of 10 hours' exposure to direct summer sunlight in the New York area.

Creams similar to the foregoing except that other known nitro musks were substituted for the musk ambrette were made and found to discolor in the period noted in the preceding paragraph.

When, however, creams similar to the foregoing were made, using the novel musk materials herein disclosed in place of the musk ambrette, no discoloration was observed, even after the equivalent of 100 hours' exposure to direct summer sunlight in the New York area.

EXAMPLE 7

*Floral soap perfume oils made with new musks*

Each of the musks made in accordance with Examples 1 to 4, inclusive, was separately incorporated in the following formulation:

| | |
|---|---|
| Geraniol | 200 |
| Amyl cinnamic aldehyde | 100 |
| Linalool Brazilian | 100 |
| Citronellal | 40 |
| Coumarin | 20 |
| Methyl cinnamate | 10 |
| Aldehyde C–12 (lauric), 10% in diethyl phthalate | 10 |
| Aldehyde C–11 (undecyclenic), 10% in diethyl phthalate | 10 |
| Hydroxy citronellal | 60 |
| Cyclament aldehyde | 6 |
| Ionone (alpha and beta mixture) | 60 |
| Anisic aldehyde | 50 |
| Phenylethyl alcohol | 214 |
| Geranium Bourbon oil | 50 |
| Musk product | 70 |

The resulting perfume oils were incorporated into white milled soap in a concentration of 1% by weight. The odor and color characteristics were excellent and remained so, even after such exposure to ultra-violet light as discolored the same soap having the same amount of the conventional nitroaromatic musks in place of our novel musks.

EXAMPLE 8

*Bouquet type soap perfume oils*

Each of the musks made in accordance with Examples 1 to 4, inclusive, was separately incorporated in the following formulation:

| | |
|---|---|
| Terpineol | 150 |
| Phenylethyl alcohol | 175 |
| Terpinyl acetate | 75 |
| Oil bois de rose Braz. | 75 |
| Oil geranium Bourbon | 75 |
| Benzyl acetate | 50 |
| Amyl cinnamic aldehyde | 50 |
| Ionone (alpha and beta mixture) | 50 |
| Hydroxy citronellal | 50 |
| Oil lavandin | 50 |
| Oil rosemary | 50 |
| Coumarin | 50 |
| Oil sandalwood, East Indian | 25 |
| Musk product | 75 |

The resulting perfume oils were incorporated into white milled soap in a concentration of 1% by weight. The odor and color characteristics were excellent and remained so, even after such exposure to ultra-violet light as discolored the same soap having the same amount of the conventional nitroaromatic musk in place of our novel musks.

The foregoing illustrates the practice of this invention which, however, is not to be limited thereby but is to be construed as broadly as permissible in view of the prior art and limited solely by the appended claims.

We claim:

1. 6 - lower - alkyl - substituted, 7 - acetyl - 1,1,4,4-tetramethyl-1,2,3,4-tetrahydronaphthalenes.

2. 7 - acetyl - 1,1,4,4,6 - pentamethyl - 1,2,3,4 - tetrahydronaphthalene.

3. 7 - acetyl - 1,1,4,4 - tetramethyl - 6 - ethyl - 1,2,3,4-tetrahydronaphthalene.

4. 7 - acetyl - 1,1,4,4 - tetramethyl - 6 - isopropyl - 1,2,3,4-tetrahydronaphthalene.

5. 7-acetyl - 1,1,4,4 - tetramethyl - 6 - t - butyl-1,2,3,4-tetrahydronaphthalene.

6. The process for preparing 6 - lower - alkyl - substituted, 7 - acetyl - 1,1,4,4 - tetramethyl - 1,2,3,4 - tetrahydronaphthalenes, which comprises condensing 2,5 - dichloro - 2,5 - dimethylhexane with a lower - alkyl - substituted benzene in the presence of a condensing agent, and acetylating the resulting lower-alkyl-substituted-1,1,4,4-tetramethyl-1,2,3,4-tetrahydronaphthalene.

7. The process for preparing 7 - acetyl - 1,1,4,4,6-pentamethyl - 1,2,3,4 - tetrahydronaphthalene, which comprises condensing 2,5 - dichloro - 2,5 - dimethylhexane with toluene in the presence of a condensing agent, and acetylating the resulting 1,1,4,4,6 - pentamethyl - 1,2,3,4-tetrahydronaphthalene.

8. The process for preparing 7 - acetyl - 1,1,4,4 - tetramethyl - 6 - ethyl - 1,2,3,4 - tetrahydronaphthalene, which comprises condensing 2,5 - dichloro - 2,5 - dimethylhexane with ethyl benzene in the presence of a condensing agent, and acetylating the resulting 1,1,4,4-tetramethyl - 6 - ethyl - 1,2,3,4 - tetrahydronaphthalene.

9. The process for preparing 7-acetyl-1,1,4,4-tetramethyl - 6 - isopropyl - 1,2,3,4 - tetrahydronaphthalene, which comprises condensing 2,5 - dichloro - 2,5 - dimethylhexane with cumene in the presence of a condensing agent, and acetylating the resulting 1,1,4,4 - tetramethyl - 6 - isopropyl - 1,2,3,4 - tetrahydronaphthalene.

10. The process for preparing 7-acetyl-1,1,4,4-tetramethyl - 6 - tertiary - butyl - 1,2,3,4 - tetrahydronaphthalene, which comprises condensing 2,5 - dichloro - 2,5-dimethylhexane with t. butyl benzene in the presence of a condensing agent, and acetylating the resulting 1,1,4,4-tetramethyl - 6 - t. - butyl - 1,2,3,4 - tetrahydronaphthalene.

References Cited in the file of this patent

UNITED STATES PATENTS 2,588,123    Kern    Mar. 4, 1952

OTHER REFERENCES

Bruson et al.: J. Am. Chem. Soc. 62, 36–44 (1940).